G. KETTENTON.
WHEELED DITCHING MACHINE.
APPLICATION FILED DEC. 24, 1919.
1,388,266.
Patented Aug. 23, 1921.
2 SHEETS—SHEET 2.
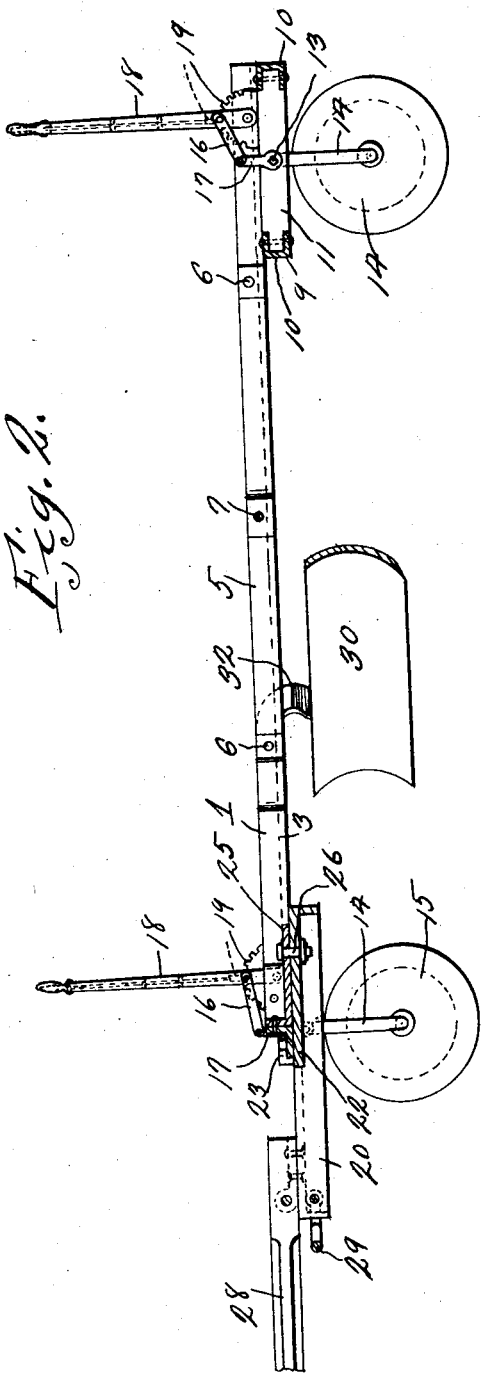
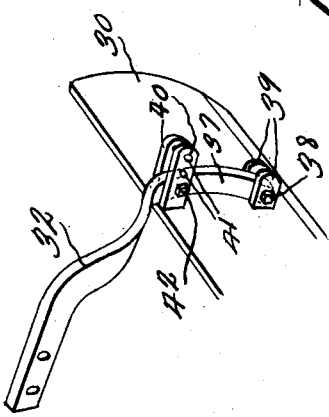
Inventor
George Kettenton
By Philip A. H. Sewell
MS, Attorney

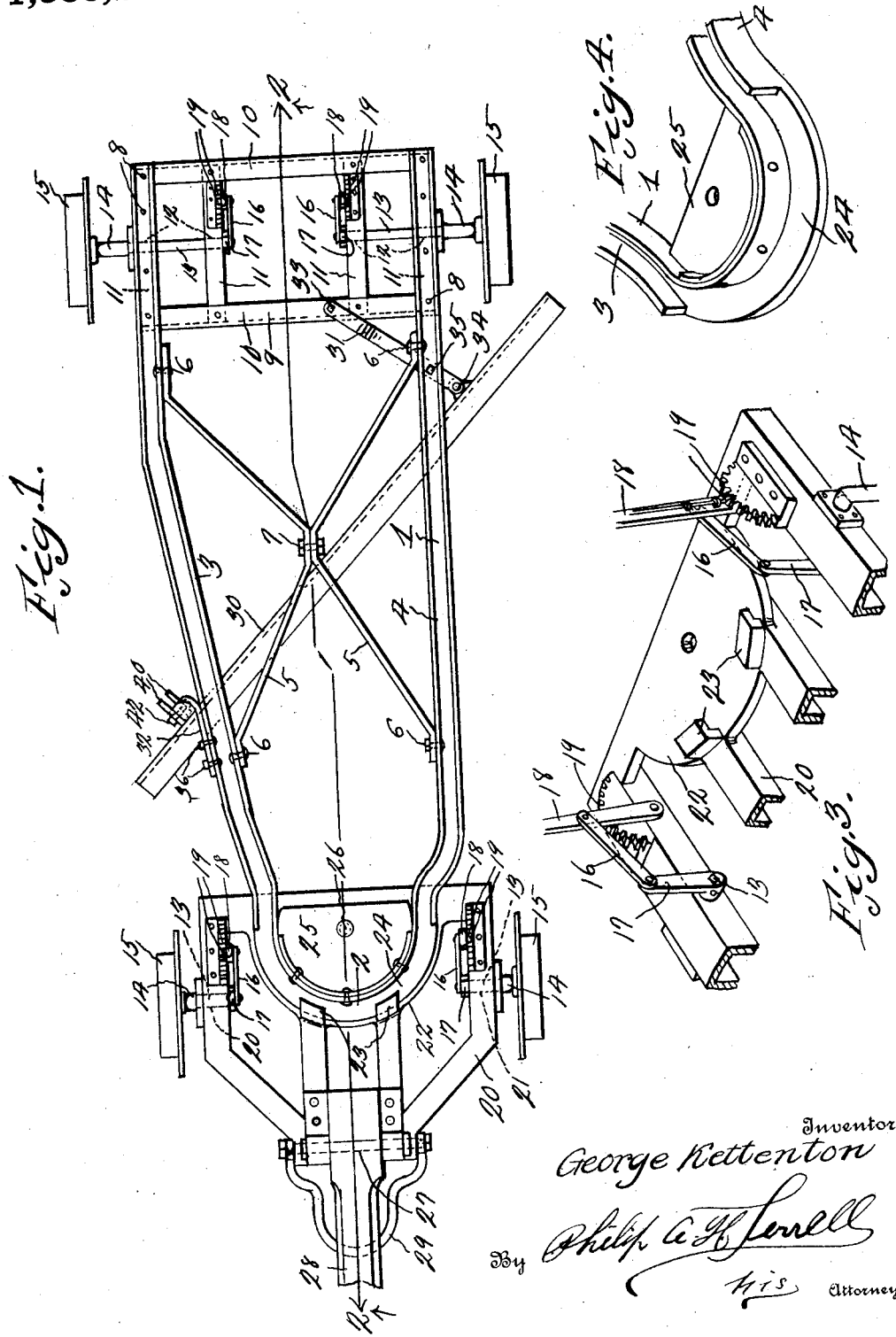

UNITED STATES PATENT OFFICE.

GEORGE KETTENTON, OF SCOTTS BLUFF, NEBRASKA.

WHEELED DITCHING-MACHINE.

1,388,266.  Specification of Letters Patent.  Patented Aug. 23, 1921.

Application filed December 24, 1919. Serial No. 347,082.

*To all whom it may concern:*

Be it known that I, GEORGE KETTENTON, a citizen of the United States, residing at Scotts Bluff, in the county of Scotts Bluff and State of Nebraska, have invented certain new and useful Improvements in Wheeled Ditching-Machines, of which the following is a specification, reference being had therein to the accompanying drawing.

The invention relates to wheeled ditching machines and has for its object to provide a machine of this character, which is particularly adapted for forming irrigation ditches and banks and checks for the same.

A further object is to provide a wheeled ditching machine wherein independent means is provided for raising and lowering the wheels so as to regulate the depth of cut taken by the scraper, or if so desired the wheels may be raised entirely out of engagement with the ground during a scraping or ditching operation. The wheels also allowing when adjusted to various positions a deep scraping of the scraper on either end thereof.

A further object is to provide a ditching machine comprising a body frame formed from channel iron, said body frame having secured thereto a scraper. Also to adjustably secure to the rear end of said frame flanged wheels for supporting the frame at various distances from the ground. The front end of the frame being supported by adjustable flanged wheels carried by a frame work provided with a fifth wheel construction, thereby allowing the easy and quick turning around of the machine as a whole within a short radius. Also to so construct the fifth wheel and its adjacent structure that said fifth wheel and the adjacent structure may be quickly and easily removed so that draft animals may be utilized for dragging the ditching machine without the use of the front wheels.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the ditching machine.

Fig. 2 is a longitudinal sectional view taken on line 2—2 of Fig. 1.

Fig. 3 is a detail perspective view of the rear end of the fifth wheel and its frame.

Fig. 4 is a perspective view of the forward end of the frame showing the upper section of the fifth wheel.

Fig. 5 is a detail perspective view of one end of the scraper blade showing its supporting bracket.

Referring to the drawings, the numeral 1 designates a U-shaped frame formed from channel iron said frame being bent as at 2 so as to form the side rails 3 and 4. Side rails 3 and 4 are braced by means of brackets 5 which are secured to said rails as at 6 and are in turn secured to each other by means of a bolt 7. The rear ends of the rails 3 and 4 are secured as at 8 to a rectangular shaped frame 9, said frame comprising the transverse bars 10 and longitudinally disposed bars 11. Rotatably mounted in bearings 12 of the bars 11 are the arms 13 of right angle supporting brackets 14 which brackets on the lower ends of the vertical arms are provided with flanged wheels 15. The flanges of the wheels 15 prevent lateral movement of the scraper during a scraping operation. By rocking the arms 13 through the medium of links 16 which are pivotally connected to arms 17 and to levers 18, the rear end of the frame 1 may be raised or lowered and held in raised or lowered position by means of dog and rack segments 19. The front end of the frame 1 is supported on a fifth wheel frame 20, said frame 20 having rotatably mounted in bearings 21 thereof, arms 13 of angle brackets 14. The wheels 15 being similar to the wheels at the rear end of the frame and their controlling mechanism the same as the controlling mechanism for the rear wheels, therefore the same numerals apply to these parts. Frame 20 is provided with a fifth wheel 22 which is preferably integral therewith. Rising upwardly from the marginal edge of the fifth wheel 22 are L-shaped lugs 23, which lugs receive and overlie the horizontal flange 24 of the forward end of the frame 1, the outer flange of the channel bar from which the frame is formed being cut away to allow the horizontal flange 24 to slide under the horizontal portions of the L-shaped lugs 23. Secured within the bent portion 2 of the frame is a flanged disk 25, said flanged disk in connection with the fifth wheel 22 forming a bearing point on which the frame 1 and the frame 20 pivot, there being a king bolt 26 passing through the fifth wheel 22 and the disk 25. Pivoted as at 27 to the forward end of the frame 20 is a tongue 28, said tongue forming means for guiding the machine,—however it is found to be preferable to provide clevis 29 to which the draft animals may be hitched, thereby relieving the strain on their necks. If so desired the tongue 28 may be removed from the machine and the draft animals hitched to the clevis 29. This is particularly advantageous when taking a deep cut, such for instance as when forming irrigation ditches, at which time the wheels 15 may be moved to a position out of engagement with the ground, especially the front wheels.

Extending diagonally across the machine and disposed under the frame 1 is a scraper 30, said scraper being supported and secured to the frame by means of brackets 31 and 32, brackets 31 being secured to one of the bars 9 as at 33 and has its other end secured as at 34 to the scraper, said bracket 31 being also secured as at 35 to the side rail 4. The bracket 32 is secured as at 36 to the side rail 3 and extends rearwardly and outwardly and has its lower curved portion 37 pivoted as at 38 between ears 39 carried by the rear face of the scraper 30, said arm 37 being secured between ears 40, which ears are provided with apertures 41 through which a bolt 42 may pass for adjusting the scraper 30 at various angles.

From the above it will be seen that a ditching machine is provided wherein it will be possible to adjust the wheels so that the scraper will take different depth of cuts, and one wherein if so desired the wheels may be moved to a position wherein the scraper will take any desired depth of cut. By providing flanged wheels the lateral movement of the machine as a whole is prevented and by providing a fifth wheel for the turning gear the ditching machine may be easily turned around whenever desired.

The invention having been set forth what is claimed as new and useful is:—

The combination with a vehicle frame formed from channel iron having its flanges extending upwardly, the forward end of the frame being semicircular, of a fifth wheel construction for the forward end of said frame, said fifth wheel comprising upper and lower members, the upper member being formed by removing the forward flange of the semi-circular portion of the frame, upwardly and rearwardly extending lugs carried by the lower member and overlying the horizontal portion of the semi-circular forward end of the frame and located on each side of the longitudinal center line of the frame, a flanged plate disposed within the semicircular forward end of the frame and having its flange secured to the rear flange of said semi-circular forward end of the plate and its body portion disposed on the lower member, and a king pin extending through the flanged plate and the lower member and concentrically disposed in relation to the upwardly and rearwardly extending lugs and in relation to the forward edge of the semicircular forward end of the vehicle frame.

In testimony whereof I hereunto affix my signature.

GEORGE KETTENTON